Sept. 27, 1955
G. E. HOLBROOK
2,719,099
INSULATING COVER
Filed Oct. 1, 1952
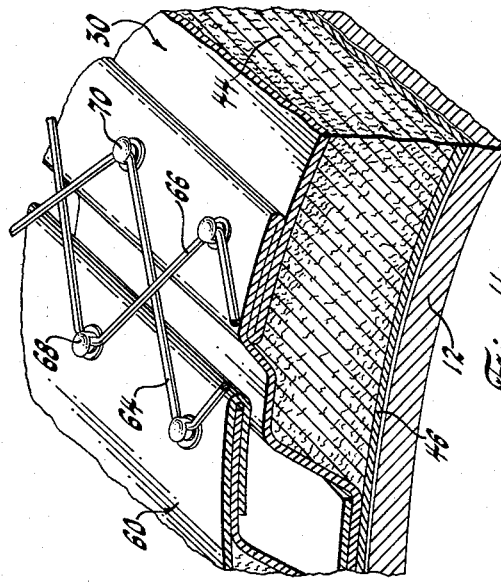
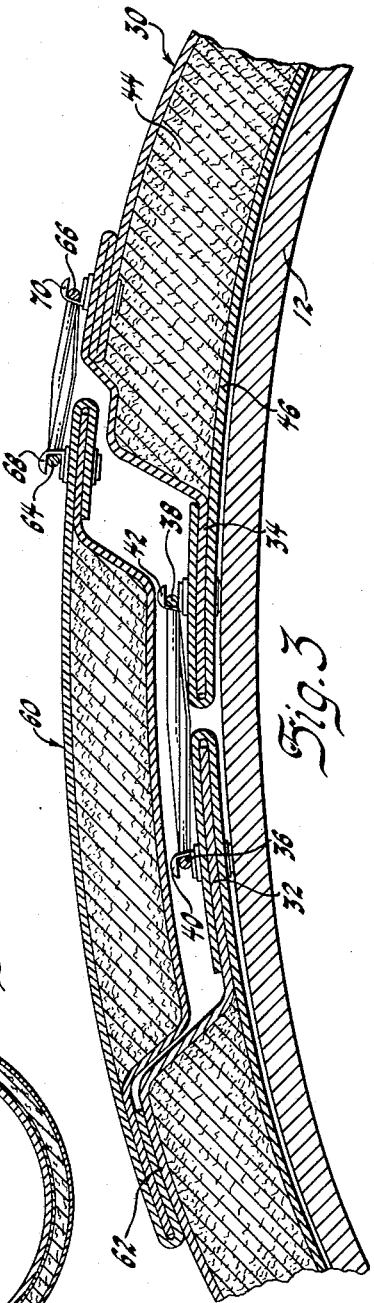
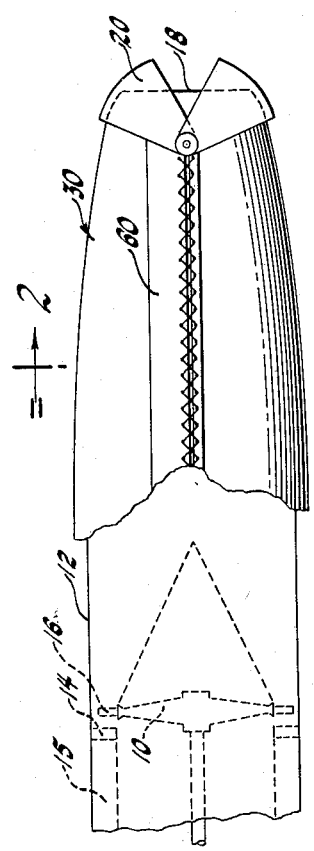
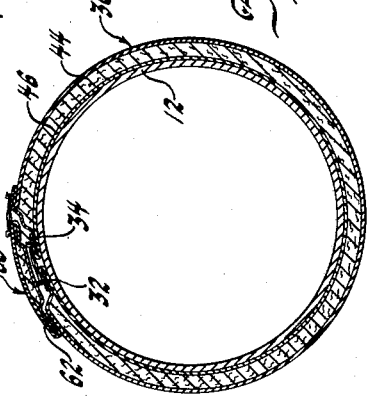
Inventor
Gordon E. Holbrook
By
Willits, Helwig & Baillio
Attorneys

United States Patent Office 2,719,099
Patented Sept. 27, 1955

2,719,099

INSULATING COVER

Gordon E. Holbrook, Indianapolis, Ind., assignor to General Motors Corporation, Detroit, Mich., a corporation of Delaware Application October 1, 1952, Serial No. 312,600

3 Claims. (Cl. 154—44)

This invention relates to insulating covers and more particularly to a means for securing together the edges of insulating covers. A common type of insulating cover is fashioned from an internal pad of soft insulation that is covered with a tough protective skin. Insulating covers of this general nature, composed of various materials depending upon their application, are used to cover the outer surfaces of high temperature casings or conduits. An important application of such insulating covers is the insulating of the exhaust casings or tail pipes of turbojet engines. Exhaust gases of these engines are extremely hot, especially in engines that utilize afterburning apparatus. Insulating covers reduce undesirable heat transfer through the exhaust casings and protect the surrounding structure of the aircraft. A typical insulating cover for a turbojet exhaust casing (which may be of a suitable high temperature steel) includes an inner pad of ½" thick asbestos felt and an outer skin of heat-reflecting Inconel foil 0.004 inch thick.

Insulating covers are generally formed in flat blanket-like pads and are installed on turbojet exhaust casings and similar large diameter conduits by lacing the edges of the cover together. A large single insulating cover or a plurality of smaller insulating covers may be laced together to form a continuous cover about the casing. The cover edges are joined together by hooks and lacing. The hooks and lacing were secured to the outer portion of the cover skin that overlaid the soft internal pad prior to the invention. It was found that this method of securing the cover edges together was unsatisfactory for the casing expanded substantially more during engine operation than the outer portion of the skin which was insulated by the fibrous inner pad. This differential thermal expansion tensioned the outer portion of the skin to an extent that compressed the inner layer of fibrous insulation and reduced its insulating effectiveness.

An object of this invention is to provide a means whereby the edge portions of an insulating cover for a casing are so secured together as to prevent expansion tensioning of the outer skin portion of the cover by the casing so that deleterious compression of the underlying internal insulation is prevented. In carrying out the invention the edge portions of the insulating cover are drawn together by the inner portion of the skin that lies on the surface of the casing rather than the outer portion of the skin, leaving the outer portion free for expansion thereby obviating its compression of the internal insulating filler. The inner portion of the skin expands with the casing but does not affect the internal insulating filler as it underlies it.

Further objects and advantages of the present invention will be apparent from the following description, reference being had to the accompanying drawings wherein a preferred form of the present invention is clearly shown.

In the drawings:

Fig. 1 is a partial plan view of a gas turbine engine having an insulating cover secured about its exhaust casing in accordance with the invention;

Fig. 2 is a sectional view taken along the plane indicated by the line 2—2 of Fig. 2;

Fig. 3 is an enlarged partial section of that portion of Fig. 2 illustrating the juncture between the end portions of the insulating cover according to the invention; and Fig. 4 is a partial perspective illustrating how the lacing may be accomplished.

It should be understood that the invention may be applied to many types of casing and conduit structures although it has proved particularly useful for insulating a turbojet engine exhaust casing.

Referring now to the drawings in detail and more particularly to Fig. 1, an insulating cover is applied in accordance with the invention to a turbojet engine of the type commony used to power high speed aircraft. Such engines include a compressor that discharges into a combustion chamber to which fuel is supplied. The heated gases from the combustion chamber drive a turbine wheel that drives the compressor. Only portions of the engine are illustrated as these engines are well known.

The turbine wheel 10 is supported for rotation in the annular casing 12 which encloses and supports the nozzle 14 that directs heated gases from the combustion chamber 15 through the turbine blades 16 to drive the turbine. The casing 12 conducts the exhaust gases to the discharge nozzle 18, the discharge area of which is increased during afterburner operation by suitably opening the "eyelid" shutters 20.

An insulating cover 30 is fitted around the external surface of the casing 12 and is secured thereto by lacing together the inside adjacent edges 32 and 34 with lacing wires 36 and 38 as shown in Figs. 2 and 3. The insulating cover may be a single sheet, as shown, or it may be composed of a plurality of sheets having their edges laced together to form a continuous cover about the casing 12. The inside edges 32 and 34 extend longitudinally of the casing 12 and the cover is provided with the rows of lacing hooks 40 and 42 that rivet in the edges. The insulating cover 30 includes a pad of asbestos felt 44 which is covered on both surfaces by an external skin 46 of Inconel foil. The inner or inside portion of the skin 46 lies on the surface of the casing 12 and is joined at its ends to the ends of the outer or outside portion of the skin by the lacing hooks 40 and 42 to form the inside edges 32 and 34. The inside edges 32 and 34 are tied together by the lacing wires 36 and 38 by passing the lacing wires back and forth across the joint. The edges 32 and 34 lie along the surface of the casing 12 with the inside portion of the skin 46 so that the drawing together of the cover edges by the lacing wires 36 and 38 is on the surface of the casing. The outer portion of the skin is therefore substantially free of the lacing and may expand with the casing and not deleteriously compress the deformable asbestos pad 44.

A flap 60 is spot welded at 62 along one outside edge of the insulating cover 30 and is secured to the other outside edge of the insulating cover by the lacing wires 64 and 66 which engage the rows of lacing hooks 68 and 70. The flap 60 is also an Inconel clad asbestos pad and serves to fill the gap in the insulating cover that results from locating the edges 32 and 34 on the surface of the casing 12. The flap 60 and the outside lacings 64 and 66 may be omitted from the construction if desired, but when they are utilized they should be loosely laced so that the outside portion of the skin 46 will not compress the filler pad 44.

The preferred embodiment of the invention has been described fully in order to explain the principles of the invention. It is to be understood that insulating sheets of compositions other than noted may be secured to various types of structures by the exercise of skill in the art according to the invention, which is not to be regarded

I claim:

1. In combination, a casing, a laminated insulating cover about said casing, said cover comprising a fibrous lamination secured to a metallic foil lamination next said casing, and releasable fastening means immediately adjacent said casing for drawing together edge portions of two adjacent foil laminations to secure said cover freely for outward expansion on said casing, said fastening means comprising hooks secured to said edge portions and the lacing engaging said hooks.

2. In combination, a casing, an insulating cover about said casing having edge portions drawn together by releasable fasteners immediately adjacent said casing to secure said cover to said casing, said cover comprising a pad of felt between a skin of metallic foil adjacent said casing and peripheral about said pad of felt, said fasteners comprising lacing wire engaging hooks secured to said edge portions proximate the surface of said casing so as to secure said cover free for outward expansion to said casing by that portion of said skin that lies on the surface of the casing thereby obviating compression of said pad of felt.

3. In combination, a casing, a laminated insulating cover about said casing, said cover comprising a pad of deformable insulation between a skin of metallic foil adjacent said casing and peripheral about said pad and having edge portions of reduced thickness proximate the surface of said casing, lacing means immediately adjacent said casing connecting said edge portions for securing said cover free for outward expansion on said casing to obviate deformation of said deformable lamination due to temperature gradients progressing from said casing through said cover, and an insulating flap on said cover overlying said lacing means filling the gap in the insulating cover that results from locating said lacing means immediately adjacent said casing.

References Cited in the file of this patent
UNITED STATES PATENTS

| | | |
|---|---|---|
| 1,251,830 | Siegfried | Jan. 1, 1918 |
| 1,762,276 | Schreier | June 10, 1930 |
| 1,907,307 | Smith | May 2, 1933 |
| 2,129,865 | Newport et al. | Sept. 13, 1938 |
| 2,175,948 | Adams | Oct. 10, 1939 |
| 2,504,421 | Johnson et al. | Apr. 18, 1950 |
| 2,514,170 | Walter et al. | July 4, 1950 |
| 2,576,698 | Russum | Nov. 27, 1951 |
| 2,691,458 | Dinwiddie | Oct. 12, 1954 |